(No Model.)
T. F. MULLANEY.
SYSTEM OF ELECTRICAL DISTRIBUTION.
No. 551,781.                       Patented Dec. 24, 1895.
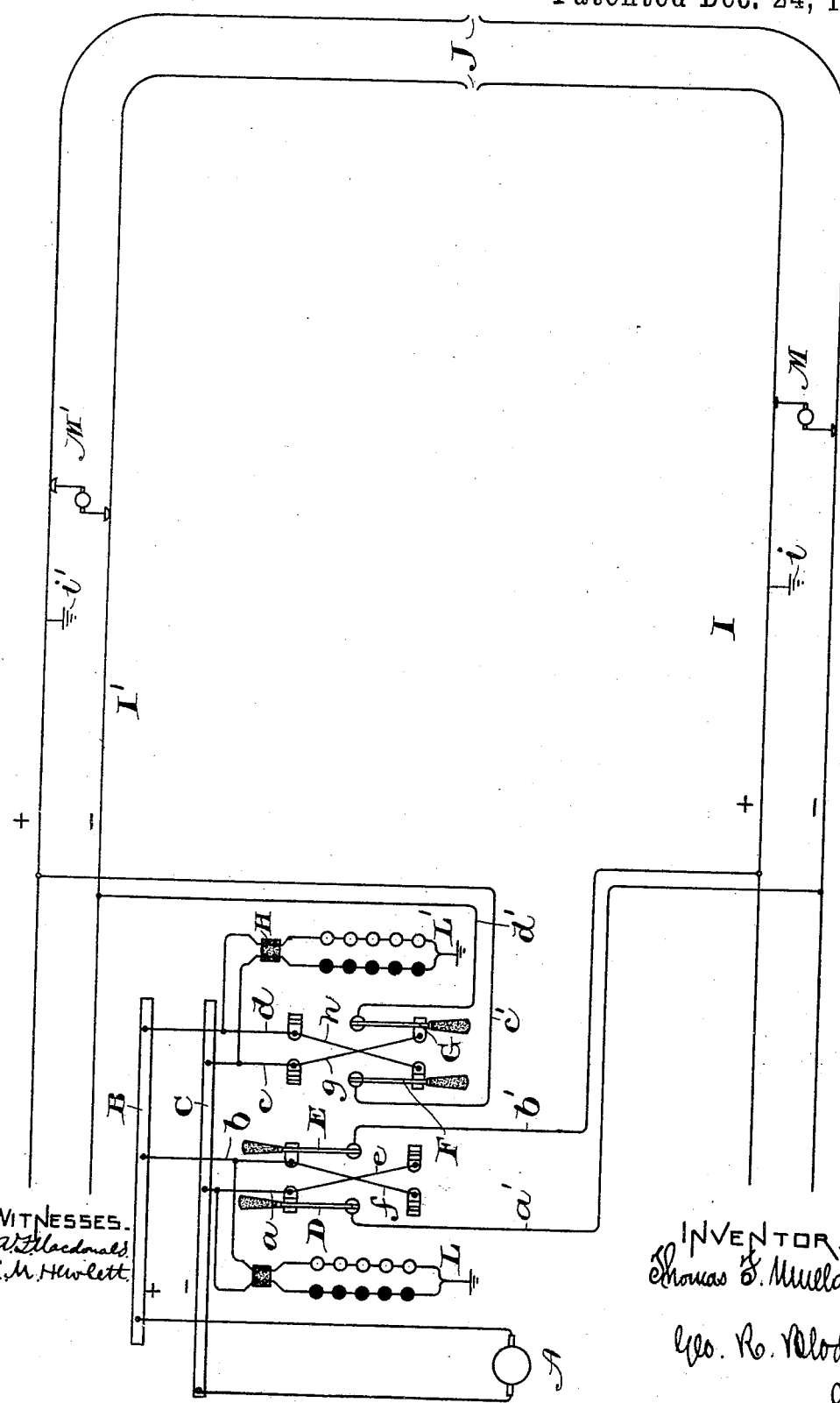
WITNESSES.
A. F. Macdonald
E. M. Hewlett
INVENTOR
Thomas F. Mullaney,
by
Geo. R. Blodgett,
Atty.

UNITED STATES PATENT OFFICE.

THOMAS F. MULLANEY, OF WORCESTER, MASSACHUSETTS, ASSIGNOR TO THE GENERAL ELECTRIC COMPANY, OF NEW YORK.

SYSTEM OF ELECTRICAL DISTRIBUTION.

SPECIFICATION forming part of Letters Patent No. 551,781, dated December 24, 1895.

Application filed September 24, 1895. Serial No. 563,512. (No model.)

*To all whom it may concern:*

Be it known that I, THOMAS F. MULLANEY, a citizen of the United States, residing at Worcester, in the county of Worcester and State of Massachusetts, have invented certain new and useful Improvements in Systems of Electrical Distribution, (Case No. 271,) of which the following is a specification.

The object of the present invention is to so arrange the system that when a ground is indicated, on the positive side for example, and there is already a ground on the negative side, the circuits can be so changed by means of switches that the grounds will both be on the same side of the system.

In conduit-railways, where the adjacent sections are usually of opposite polarity arranged in a manner well known in the art, a ground occurring upon one side of a section would not disable it, but should the next section become grounded through the conductor of the opposite polarity then there would be a short circuit and the system would be disabled until repairs could be made either by cutting out the grounded sections or suitably insulating the conductors. It is to overcome this difficulty that the present invention is intended, and to accomplish this double-throw switches are placed in circuit with each feeder and provided with suitable cross connections, so that when they are in the "up" position they connect the conductors of a section in one manner and when "down" in the opposite—that is, the conductor which was of the positive sign becomes negative and vice versa. For the purpose of indicating a ground on the line, a number of incandescent lamps are connected to the feeders from a point between the bus-bars and switches to ground. Thus a ground can be immediately detected at the power-house.

In the accompanying drawing, attached to and made a part of this specification, is represented an embodiment of my invention, wherein—

A represents a generator of any well-known type with the leads therefrom connected to positive and negative bus-bars B C. Single-pole double-throw switches D, E, F and G are shown connected between the bus-bars and the feeders. Although single-pole switches are shown, it is not necessary that they be arranged to work separately. The upper and lower terminals of the switches are cross-connected to each other by wires $e$, $f$, $g$ and $h$ in such a manner as to reverse the current flowing in the feeders $a'$, $b'$, $c'$ and $d'$ when thrown to a position opposite to that shown.

The feeders $a'$ $b'$ are respectively connected to the negative and positive conductors of section I, and feeders $c'$ $d'$ to the positive and negative conductors of the section I'. M and M' indicate motors running on the different sections. J indicates insulation, such as an air-gap, between the sections.

From each of the feeders $a$, $b$, $c$ and $d$ connections are made with series of incandescent lamps L L', each series being grounded. It is not necessary that the lamps be in circuit all the time, and to cut them out a double-pole connecting-plug H is shown.

The positive conductors of this system being grounded there would be a current flowing through the lamps on the right side of each pair, and these are indicated by small circles, while those on the left are in solid black, indicating that no current is passing.

For the purpose of illustration let it be assumed that the switches are both up and that section I has a ground on the positive side at the point $i$. This would not necessitate the shutting down of the section. But suppose a ground were now indicated on the negative side of I' at $i'$. There would now be a short circuit and the system would be disabled until the machine at the station could either burn out the short circuit or it could be repaired. It is not always possible to do these things immediately, and so, to make the grounds come on the same side of the system, the switches F and G are thrown down to the position shown. This will reverse the polarity of the conductor on which the ground $i'$ occurs, and both the grounded conductors are now of the same sign and the short circuit is broken.

The present invention has been described in connection with a conduit-railway system; but it is evident that it could be applied to any system, whether for lighting, power or railway work with the conductors suspended in air.

What I claim as new, and desire to secure by Letters Patent of the United States, is—

1. A system of distribution in which the conductors are divided into sections, in combination with means for throwing the grounds of the different sections upon conductors of the same polarity.

2. In a system of distribution, the combination of conductors divided into sections, the adjacent sections being of opposite polarity, with switches for connecting certain of the conductors in such a manner that they may be supplied with current of the same polarity.

3. In a system of distribution, the combination of conductors divided into sections, means for indicating a ground on either side of a section, and switches for reversing the connection between the source of power and the sections.

4. In a system of distribution, the combination of sectional conductors, feeders connecting the sections with the source of supply, a ground-indicating device in circuit with each feeder and the ground, and switches for reversing the polarity of the conductors forming a section.

5. In a system of distribution, the combination of sectional conductors, feeders connecting the sections with the source of supply, and means for changing the polarity of the conductors.

6. In a system of distribution, the combination of sectional conductors, normally insulated from the ground, feeders connecting the sections with the source of power and switches for changing the polarity of the sectional conductors when they become accidentally grounded.

In witness whereof I have hereunto set my hand this 12th day of September, 1895.

THOMAS F. MULLANEY.

Witnesses:
 C. R. WATERBURY,
 A. B. TRIGGE.